US006694423B1

(12) United States Patent
Singh et al.

(10) Patent No.: US 6,694,423 B1
(45) Date of Patent: Feb. 17, 2004

(54) PREFETCH STREAMING BUFFER

(75) Inventors: Balraj Singh, Morgan Hill, CA (US); Manuel O. Gautho, San Jose, CA (US); Venkat Mattela, San Jose, CA (US)

(73) Assignee: Infineon Technologies North America Corp., San Jose, CA (US)

( * ) Notice: Subject to any disclaimer, the term of this patent is extended or adjusted under 35 U.S.C. 154(b) by 0 days.

(21) Appl. No.: 09/320,336

(22) Filed: May 26, 1999

(51) Int. Cl.[7] ................................................ G06F 9/34
(52) U.S. Cl. ........................ 712/204; 712/206; 712/210
(58) Field of Search ............................... 712/204, 206, 712/207, 210, 215, 23

(56) References Cited

U.S. PATENT DOCUMENTS

| | | | | |
|---|---|---|---|---|
| 4,236,206 A | * | 11/1980 | Strecker et al. ............. | 712/204 |
| 4,435,792 A | * | 3/1984 | Bechtolsheim .............. | 369/189 |
| 4,502,111 A | * | 2/1985 | Riffe et al. ................. | 712/204 |
| 4,729,119 A | * | 3/1988 | Dennison et al. ........... | 365/230 |
| 4,956,801 A | * | 9/1990 | Priem et al. ................ | 708/514 |
| 5,113,515 A | * | 5/1992 | Fite et al. ................... | 711/125 |
| 5,148,528 A | * | 9/1992 | Fite et al. ................... | 712/210 |
| 5,222,240 A | * | 6/1993 | Patel ........................... | 712/218 |
| 5,644,744 A |   | 7/1997 | Mahin et al. | |
| 5,724,422 A | * | 3/1998 | Shang et al. .................. | 380/4 |
| 5,822,559 A |   | 10/1998 | Narayan et al. | |
| 5,978,896 A | * | 11/1999 | Kahle et al. ................. | 712/23 |

* cited by examiner

*Primary Examiner*—Gautam R. Patel
(74) *Attorney, Agent, or Firm*—Fish & Richardson P.C.

(57) ABSTRACT

A data processing unit having superscalar structure able to execute a plurality of instructions in parallel includes a memory for storing the instructions having a plurality of n-bit input/output ports, an instruction fetch unit, a coupling unit for coupling said memory with the instruction fetch unit, and an instruction stream request control unit for addressing the mmory to provide an instruction stream at its output ports. The coupling unit includes a shifter having an input and an output and a control input, the input being coupled with the output ports of the memory, the output being coupled with the instruction fetch unit, and the control input being coupled with the instruction stream request control unit. The instruction fetch unit has a register for storing said instruction stream and a shifter to shift the content of the register.

20 Claims, 3 Drawing Sheets

PREFETCH STREAMING BUFFER

BACKGROUND OF THE INVENTION

The present invention is related to a method and an arrangement for prefetching and aligning an instruction stream provided by a memory unit. Modern microprocessors have the ability of executing multiple instructions in parallel. Such microprocessors usually have a pipelined structure and comprise multiple execution units to execute instructions in parallel. For example, a microprocessor might have a load and store execution unit for performing load and store instructions and an arithmetic logic unit for executing data manipulating instructions. Furthermore, a 32-bit microprocessor might be able to execute instructions with variable lengths, for example, 16-bit instructions and 32-bit instructions.

To provide such a pipelined structure with the respective instructions from memory, usually a request is made to the memory unit. The memory unit has to load the respective number of instructions from the memory and provide the fetch unit with those instructions. As memory systems are usually slow compared to execution units, such an arrangement forms a bottleneck in the execution of instructions. Especially when it comes to a so-called boundary crossing memory systems can not retrieve the requested data/instructions within one single access. A memory system is usually organized in lines and columns. Only a single line can be accessed at a time. Therefore, if the start and end addresses of a requested instruction stream lie not within a single line, only part of the requested information can be retrieved. The rest of the information has to be provided within a second request.

SUMMARY OF THE INVENTION

It is therefore an object of the present invention to provide a method and apparatus for providing a plurality of aligned instructions from an instruction stream with a minimum of delay.

A data processing unit according to the present invention has a superscalar structure being able to execute a plurality of instructions in parallel, a memory for storing said instructions having a plurality of n-bit input/output ports, and a coupling unit for coupling said memory with a instruction fetch unit, a instruction stream request control unit for addressing said memory to provide an instruction stream at its output port. The coupling unit comprises a shifter having an input and an output and a control input, the input is coupled with the memory, and the control input being coupled with the instruction stream request control unit. The instruction fetch unit comprises a register for storing the instruction stream, a register control unit for dispatching the plurality of instructions from the register, and means for shifting the content of the register.

In another embodiment a data processing unit has a superscalar structure being able to execute a plurality of instructions in parallel, a memory for storing the instructions having a plurality of n-bit input/output ports, and a coupling unit for coupling the memory with an instruction fetch unit, a instruction stream request control unit for addressing the memory to provide an instruction stream at its output port. The coupling unit comprises a shifter having an input and an output and a control input, the input being coupled with the memory, and the control input being coupled with the instruction stream request control unit. The instruction fetch unit comprises a register for storing the instruction stream, a register control unit for dispatching the plurality of instructions from the register, and means for writing a partial content of the register into the shifter.

With an arrangement, such as described in the embodiments, it is possible to prevent many cases where a boundary crossing would result in stalling the pipelines with a minimum of additional hardware. The longer the prefetch buffers are designed the less the probability of a boundary crossing will occur.

A Method for providing a plurality of instructions from a memory having a plurality of n-bit input/output ports to a processing unit within a data processor having a superscalar structure, and being able to execute a plurality of instructions in parallel, comprises the steps of:

a) addressing said memory to output an instruction stream at its output ports; and b) issuing a number of instructions from said instruction stream and buffering at least the instructions of said instruction stream which have not been issued.

Furthermore, a method for providing a plurality of instructions from a memory having a plurality of n-bit input/output ports to a processing unit within a data processor having a superscalar structure being able to execute a plurality of instructions in parallel is disclosed. The method comprises the steps of:

a) issuing a number of instructions from a previously stored instruction stream, b) generating an address and a shift value depending on the previously issued instructions;

c) addressing the memory to output an instruction stream at its output port, d) combining the instruction stream with the previously not issued instruction stream and aligning the instruction stream, e) storing the combined instruction stream;

f) repeating steps a)–f).

DESCRIPTION OF THE PREFERRED EMBODIMENT

Figure 1:
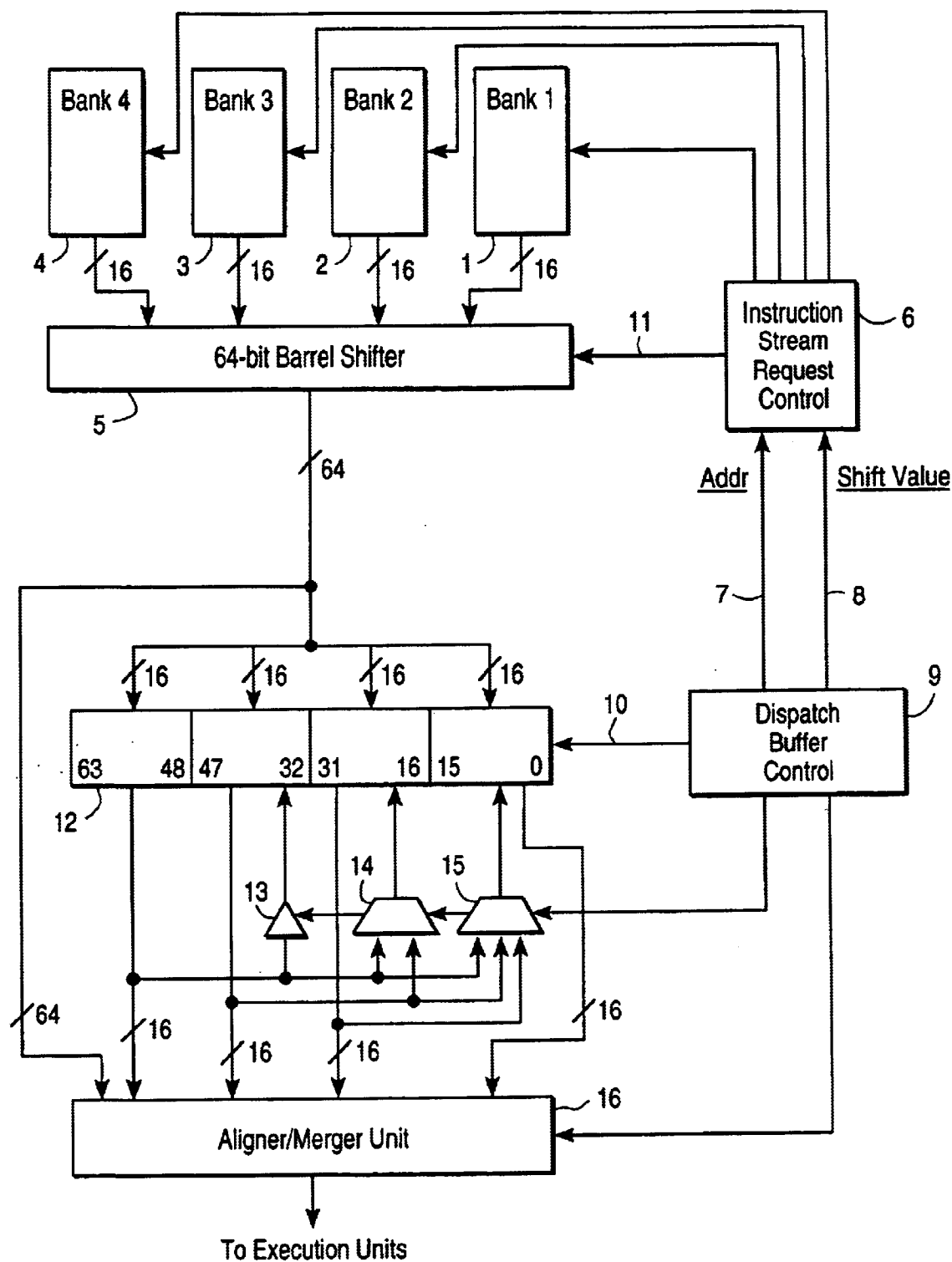
FIG. 1 is a block diagram of a first embodiment according to the present invention.

A memory system, such as a cache memory or an instruction memory, is designed to have four memory banks 1, 2, 3 and 4. Each memory bank has an output port being 16 bits wide. The memory is arranged in lines and columns, whereby the line size defines the maximum size of data that can be accessed in parallel. In this embodiment, the line size is 256 bit and the output size of the memory system is 64 bit, which reduces the probability of a boundary crossing. Therefore, each memory bank is organized in 64 bit lines, whereby each bank has a 16 bit output port. Each memory bank 1, 2, 3, and 4 has the respective multiplexers to couple the respective memory cells of each bank with the respective output port. The four memory banks 1, 2, 3 and 4 are addressed by an instruction stream request control unit 6. A program consisting of a plurality of sequential instructions is stored in this memory unit in such a way that 64 bits of a continuous instruction stream can be output in parallel. Within one access cycle the memory can address one line consisting of, for example, 256 bits and output a selection of 64 bits at its output port. The output of memory banks 1, 2, 3 and 4 are coupled with the input of a 64 bit barrel shifter 5. Barrel shifter 5 is controlled via control signal 11 generated by instruction stream request control unit 6. The output of barrel shifter 5 is split into four 16 bit signals which are coupled with a buffer register 12. Read and write control signals 10 are generated by a dispatch buffer control unit 9 which also generates a request address 7 and a shift value 8 being fed to instruction stream request control unit 6.

A first multiplexer 15 having three 16 bit inputs and one 16 bit output, a second multiplexer having two 16 bit inputs and one 16 bit output, and a 16 bit controllable line driver 13 are provided. Bits 0–15 of buffer register 12 are coupled with the output of multiplexer 15. Bits 16–31 are coupled with the output of multiplexer 14 and bits 32–47 are coupled with the output of controllable line driver 13. The input of controllable line driver 13, the first input of multiplexer 14, and the first input of multiplexer 15 are coupled with bits 48–63 of buffer register 12. The second input of multiplexer 14 and the second input of multiplexer 15 are coupled with bits 32–47 of buffer register 12. Finally, bits 16–31 of buffer register 12 are coupled with the third input of multiplexer 15. Multiplexer 15, multiplexer 14 and controllable line driver 13 are controlled by dispatch buffer control unit 9. The output of barrel shifter 5 is also coupled with an aligner/merger unit 16 which also receives the output signals of buffer register 12. To align or merge the received signals in an appropriate way, aligner/merger unit 16 receives respective control signals, for example, from the dispatch buffer control unit 9 or from the instruction stream request control unit 6.

After a reset of a microcontroller according to this embodiment, buffer register 12 is either empty or undefined. Dispatch buffer control unit 9 requests a first instruction stream by providing instruction stream request control unit 6 with a start address and a shift value of 0. Instruction stream request control unit 6 addresses the four memory banks 1, 2, 3 and 4 to output a continuous instruction stream, for example, starting with address 0. In this embodiment, bank 1 provides start addresses of 0, 64, 128, . . . ; memory bank 2 provides start addresses of 16, 80, 144, . . . ; memory bank 3 provides start addresses of 32, 96, 160, . . . ; and memory bank 4 provides start addresses of 48, 112, 176, . . . . In this embodiment an accessed line has start addresses of 0, 32, 64, . . . and end addresses of 31, 63, 95 . . . , respectively, whereby each address accesses one byte. For example, in case of a start address of 24 the instruction stream of 64 bit (=8 bytes) ends with address 31. Thus, the addressed 64 bit instruction stream which is output by such a memory system will be aligned and no boundary crossing will occur. Thus, control signal 11 is 24 and barrel shifter 5 is not shifting this instruction stream. The output of barrel shifter 5 will be written into buffer register 12.

A microprocessor according to the present invention may be able to execute more than one instruction in parallel. Furthermore, a microprocessor according to the present invention may be able to execute instructions with different instruction lengths, for example 8 bit, 16, 32 bit, etc. Thus, the actual issued instruction stream can vary from a minimum length to a maximum length. In the embodiment according to the present invention, a microprocessor has a minimum instruction length of 16 bits and a maximum instruction length of 64 bits. It is possible to issue either a single 16 bit instruction, two single 16 bit instructions, one 32 bit instruction, one 16 bit instruction and one 32 bit instruction, or two 32 bit instructions. Depending upon how many instructions have been issued, dispatch buffer control unit 9 generates a new address 7 and a shift value 8 for the following cycle.

Therefore, the structure of the output port of memory 1, the barrel shifter 5, and register buffer 12 is segmented in this embodiment into four units of 16 bit which is the minimal instruction size. Any kind of arrangement for these units can be chosen according to the size of an instruction. Instructions are generally m×p bits in length, whereby m>=1.

In an example, the start address is set to 24. If one 16 bit instruction and one 32 bit instruction have been issued, the address generated by dispatch buffer control unit 9 will be 32 for the following 64 bit instruction stream and the shift value will be 3. During a following request for a further instruction stream, dispatch buffer control unit 9 would send this address value and this shift value to instruction request control unit 6 and control multiplexer 15 to shift the content of bit locations 48–63 of buffer register 12 to the bit locations 0–15. Multiplexers 14 and bit line driver 13 will not be activated in this case. The write circuitry therefore shifts content of the buffer register 12.

Instruction request control unit 6 generates addresses for memory banks 1, 2, 3 and 4 starting with the start address 32 in memory bank 1. The arrangement according to the invention prevents a boundary crossing which would have occurred in a known system. Namely, the address of the requested instruction stream would have been equal to the address of the first instruction byte that has not been issued yet, in the above example, address 31. Thus, a boundary crossing and a delay between address 31 and address 32 would have taken place.

As the contents of memory bank 4 has to be transferred to bit locations 16–31 of buffer register 12 and the content of memory bank 1 to bit locations 32–47 of buffer register 12, and the content of memory bank 2 to bit locations 48–63, instruction stream request control unit 6 generates a control signal 11. To align the instruction stream from memory banks 1, 2, 3 and 4, bits 1 and 2 of the address signal 7 are used. If the address is 6, as assumed in this example, bits 1 and 2 are both "1". Thus, bits 1 and 2 of address 7 form a shift value of 3. If barrel shifter 5 could shift its contents by 3×16 bits, the instruction stream provided by memory banks 1, 2, 3 and 4 would be aligned. In this example, the instruction stream has to be aligned with bit 16 of register buffer 12 as the content of bits 0–15 have been stored in register 12 and not been issued yet. Thus, shift value 8 has to indicate a left shift by 1. Combining these two values results in a right shift by 2×16 bits. The shifted instruction stream in barrel shifter 5 is then transferred to buffer register 12, whereby dispatch buffer control unit 9 excludes bits 0–15 of buffer register 12 to be overwritten. After this operation, buffer register 12 contains an aligned instruction stream of 64 bits which follows a previously issued instruction stream with no delays.

In parallel, aligner/merger unit 16 receives the same output signals from barrel shifter 5 and the previously stored data from buffer register 12. With the control signals provided by dispatch buffer control unit 9 it combines the two data streams to a 64 bit instruction stream in the same manner as described above. Thie output signal which is provided to the execution units is identical to the instruction stream which will be buffered in buffer register 12. This is done in parallel to avoid a penalty cycle from assembling the instruction stream in buffer register 12. Aligner/merger unit 16 can be built by a plurality of multiplexerswhich are controlled by dispatch buffer control unit.

The resulting shift value for barrel shifter 5 is determined depending on how many 16 bit portions of register buffer 12 have been issued and on the actual location (bank) within the memory system. Table 1 shows the different shift values for barrel shifter 5 according to start address and number of previously issued instructions. Negative shift values indicate a left shift and positive shift values a right shift.

TABLE 1

| address bits | | 16 bits | 32 bits | 48 bits | 64 bits |
|---|---|---|---|---|---|
| 2 | 1 | issued | issued | issued | issued |
| 0 | 0 | −3 | −2 | −1 | 0 |
| 0 | 1 | −2 | −1 | 0 | +1 |
| 1 | 0 | −1 | 0 | +1 | +2 |
| 1 | 1 | 0 | +1 | +2 | +3 |

The resulting shift value is calculated as:

$(5-y)-(x+1)=4-y-x$ whereby y is the value of address bits 2 and 1 and x the number of 16 bit portions that have been issued.

Figure 3:
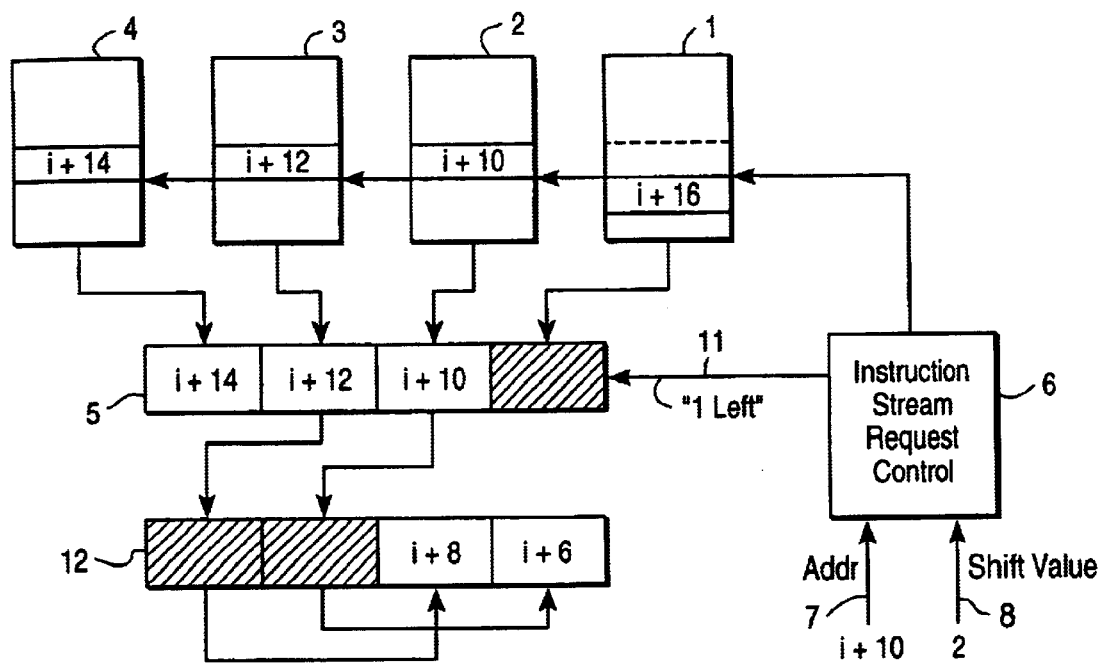
FIG. 3 is a block diagram showing the flow of an instruction stream according to the first embodiment of the present invention.

FIG. 3 shows as a further example a resulting instruction data path within a system according to the first embodiment. In FIG. 3, it is assumed that two instructions I+4 and I+2 have been issued from an instruction stream stored in buffer register 12. Dispatch buffer control unit 9 then controls multiplexers 14 and 15 to shift the contents of bits 32–63 to bits 0–31 of buffer register 12. Dispatch buffer control unit 9 further provides an address signal I+10 and a shift value of 2 to instruction stream request control unit 6. Instruction stream request control unit 6 then addresses memory banks 1, 2, 3 and 4 to provide instructions I+10, I+12, I+14 and I+16. As indicated in FIG. 3, only addresses I+10, i+12, I+14 lie within one memory line. Address 16 cannot be accessed in this cycle. As only two 16 bit words are needed this boundary cross doesn't matter and will result in no delay because addresses i+14 and i+16 are not needed. The content of addresses i+10, i+12, and i+14 are transferred into the 64 bit barrel shifter 5. In address I+10 bits 1 and 2 would be 1 and 0, respectively. Thus, instruction stream request control unit 6 would generate a final left shift by 1 according to table 1. Then, instruction I+10 and instruction I+12 would be at the two most left positions in barrel shifter 5 and ready to be transferred to buffer register 12 to fill up its content.

As described above, to avoid a penalty cycle, aligner/merger unit 16 receives all 64 bits from barrel shifter 5 and all 64 bits from buffer register 12. Aligner/merger unit 16 selects in this case in parallel bits 32–63 from buffer register 12 as output bits 0–31 and bits 16–47 from barrel shifter 5 as output bits 32–63.

Buffer register 12 does not necessarily have to be limited to the size of barrel shifter 5. If a bigger buffer register 12 is used, additional multiplexers between barrel shifter 5 and buffer register 12 have to be provided to align the content of barrel shifter 5 with the previously not issued instructions of buffer register 12.

A boundary crossing can only occur if it lies within the requested instruction stream and data that is stored across the boundary is needed to fill up register 12. In all other cases no delay will occur. To minimize the chances of such a delay, memory line size and buffer register size can be increased.

Figure 2:
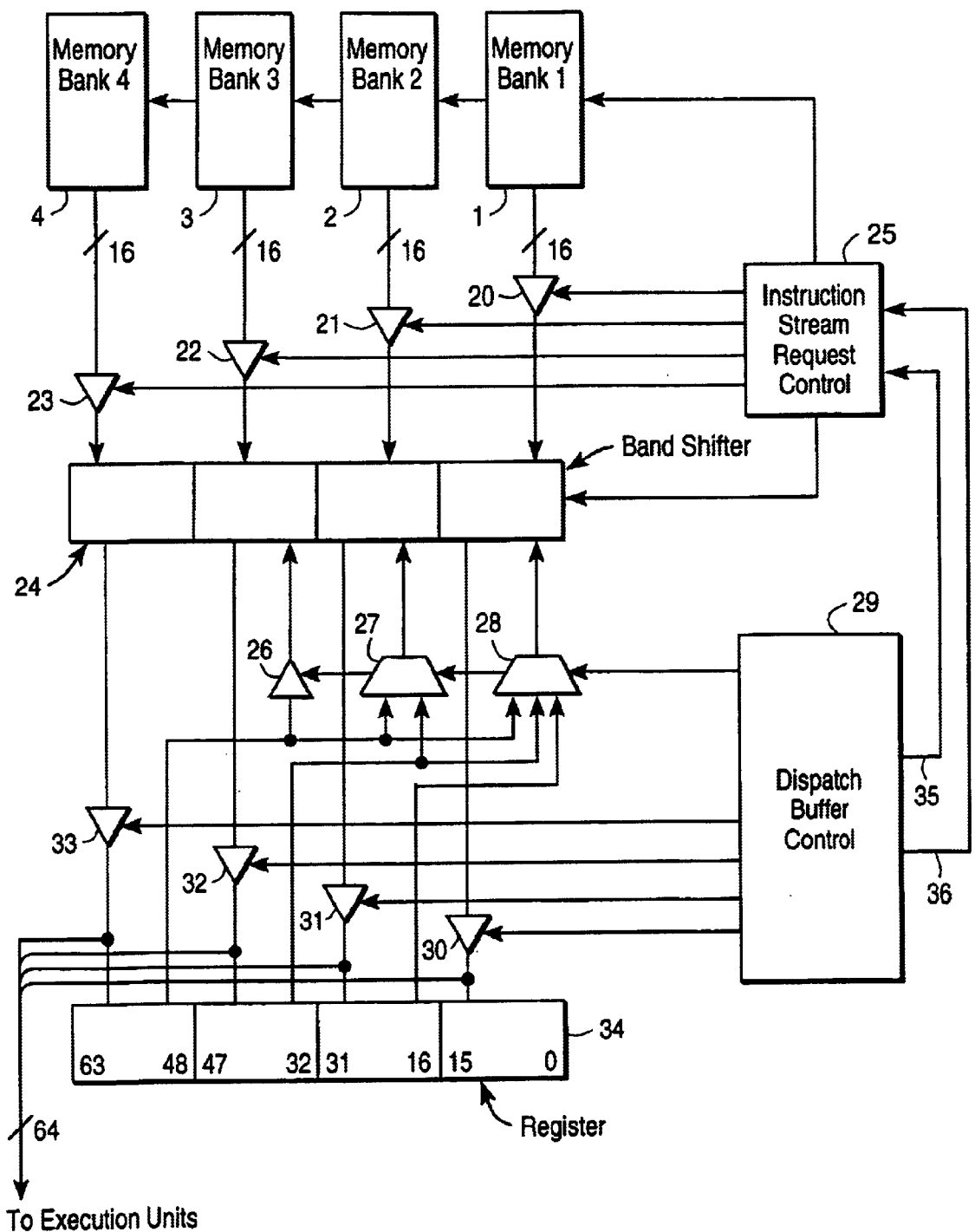
FIG. 2 is a block diagram of a second embodiment according to the present invention.

FIG. 2 shows a second embodiment according to the present invention. Again, a memory system which is identical to the memory system of the first embodiment with memory banks 1, 2, 3 and 4 are coupled via control level line drivers 20, 21, 22 and 232 respectively, with a barrel shifter 24. The line drivers 20, 21, 22 and 23 are controlled by instruction stream request control unit 25 which also controls barrel shifter 24. In a similar manner, barrel shifter 24 is coupled with a buffer register 34 via four control level 16 bit line drivers 30, 31, 32 and 33. Another 16 bit line driver 26 is provided which couples the contents of bits 48–63 of register 34 with bits 32–47 of barrel shifter 24. A multiplexer 27 with two 16 bit inputs and one 16 bit output, and a multiplexer 28 with three 16 bit inputs and one 16 bit output are provided. The output of multiplexer 27 is coupled with bits 16–31 of barrel shifter 24 and the output of multiplexer 28 is coupled with bits 0–15 of barrel shifter 24. The first input of multiplexer 27 and the first input of multiplexer 28 are coupled with bits 48–63 of register 34. The second inputs of multiplexer 27 and multiplexer 28 are coupled with bits 32–47 of register 34. Finally, bits 16–31 of register 34 are coupled with the third input of multiplexer 28. The output of line drivers 30, 31, 32, and 33 are fed in parallel to the execution units. The dispatch buffer control unit 29 is provided which controls line drivers 26 30, 31, 32 and 33, and multiplexers 27 and 28. Dispatch buffer control unit 29 also generates an address signal 35 and shift value 36 which is provided to instruction stream request control unit 25. Write circuitry, including line driver 26 and multiplexers 27, 28, writes q×p bits to the barrel shifter, whereby q<the maximum number of the p-bit portions in barrel shifter 24. In the present embodiment p=16 bits. Of course, this arrangement can be adapted to any instruction size. Instead of multiplexers, controllable drivers, or buffers can be used. Barrel shifter 24 can also be implemented by multiplexers. Furthermore, a simple shifter can be used that is only able to shift in one direction. The control signals have to be adapted accordingly. Barrel shifter 24 is controlled by a similar control signal as shown in FIG. 1 and in accordance with Table 1.

Figure 4:
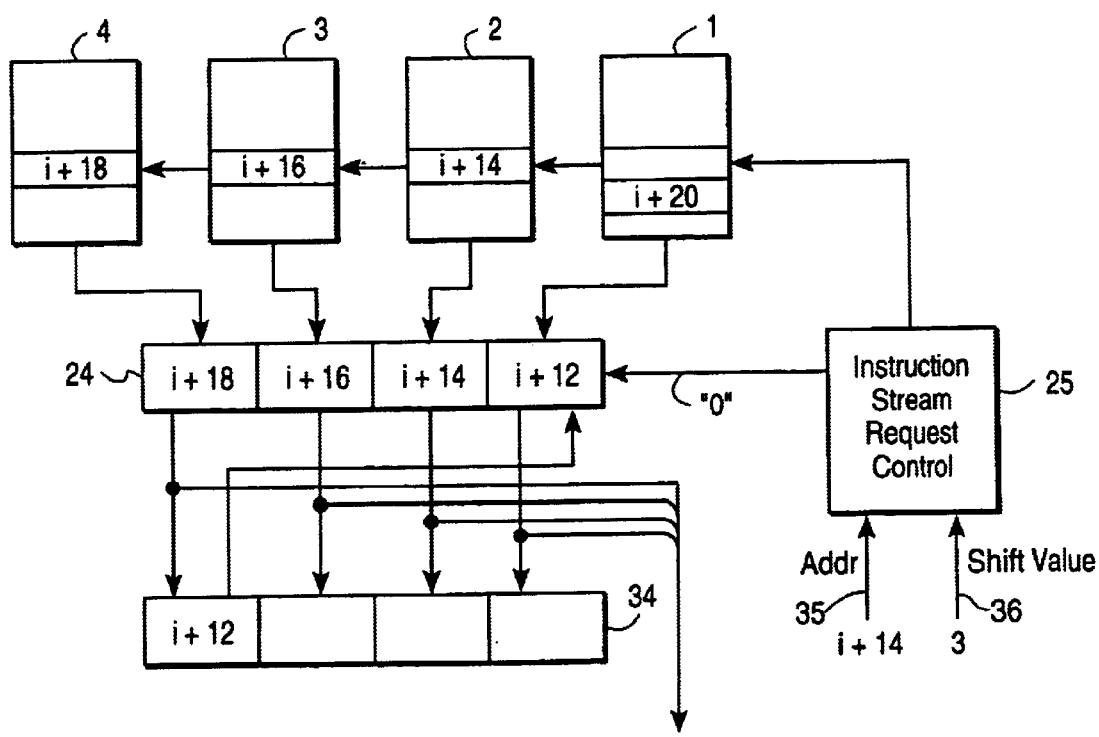
FIG. 4 is a block diagram showing the flow of an instruction stream according to the second embodiment of the present invention.

The function of the second embodiment will be explained in accordance with the description of FIG. 4. FIG. 4 shows the instruction data flow path of the second embodiment. It is assumed that instruction data I+6, I+8 and I+10 have been issued during a previous cycle. Thus, bits 48–63 of buffer register 34 contain the not previously issued instruction data I+12. During the request of a further instruction stream, the contents of the bits 48–63 will be written into bits 0–15 of barrel shifter 24 through multiplexer 28. Instruction stream request control unit 25 receives address 35 which contains I+14 and shift value 36 which contains the value 3. Thus, assuming address bits 1 and 2 are "1"and "0", respectively, according to Table 1, the resulting shift value will be "0". The instruction stream will be aligned and can be transferred. If instead of the first addressed bank 2, for example, bank 3 would have been addressed, then a boundary crossing would occur at address i+16 which would only stall the pipelines if all 64 bit have to be issued.

In this embodiment, no aligner/merger unit is needed to avoid a delay while providing the instruction stream to the execution units. The instruction stream will be assembled within the barrel shifter 24 which is supplied with the respective data from both sides, the memory banks 1, 2, 3, and 4 and the buffer register 34. After the appropriate shift operation the output of barrel shifter 24 provide an aligned instruction stream which can be fed directly to the execution units and in parallel stored in buffer register 34.

What is claimed:

1. A data processing unit having superscalar structure being able to execute a plurality of instructions in parallel, the data processing unit comprising:
   a memory for storing the instructions, the memory having a plurality of n-bit input/output ports;
   an instruction stream request control unit for addressing the memory to provide an instruction stream at the output ports of the memory;
   a coupling unit comprising a shifter having an input and an output and a control input, the input of the shifter being coupled with the output ports of the memory, and the control input of the shifter being coupled with the instruction stream request control unit;
   a register to store the instruction stream, the register having an input and an output, the input of the register being coupled to the output of the shifter;
   a merger unit having an input and an output, the output of the merger unit to provide instructions to an execution unit, the input of the merger unit being coupled in parallel to the output of the shifter and the output of the register, and
   write circuitry having an input and an output, the input of the write circuitry being coupled to the output of the register, the output of the write circuitry being coupled to the input of the register, the write circuitry configured to shift the content of the register to generate an aligned instruction stream for the output of the merger unit.

2. Data processing unit according to claim 1, wherein the shifter is a barrel shifter.

3. Data processing unit according to claim 1, wherein the shifter is formed by multiplexers.

4. Data processing unit according to claim 1, wherein each instruction comprises m×p bits, wherein m>=1, and the write circuitry is able to shift the register content by p bits to the right.

5. Data processing unit according to claim 1, wherein the instruction stream request control unit receives an address and a shift value.

6. Data processing unit according to claim 5, wherein the instruction stream request control unit generates a control signal for the shifter from the address and the shift value.

7. Data processing unit according to claim 1, wherein the merger unit merges the content of the shifter and the register according to a control signal.

8. Data processing unit according to claim 1, further comprising a dispatch control buffer coupled with the write circuitry and the instruction stream request control unit for controlling the write circuitry.

9. Data processing unit according to claim 8, wherein the instruction stream request control unit receives an address and a shift value from the dispatch control unit.

10. Data processing unit according to claim 9, wherein the instruction stream request control unit generates a control signal for the shifter from the address and the shift value.

11. Data processing unit according to claim 1, wherein write circuitry includes a line driver and a plurality of multiplexers.

12. A data processing unit having superscalar structure being able to execute a plurality of instructions in parallel, the data processing unit comprising:
   a memory for storing the instructions, the memory having a plurality of n-bit input/output ports;
   an instruction stream request control unit for addressing the memory to provide an instruction stream at the output ports of the memory;
   a coupling unit comprising a shifter having an input and an output and a control input, the input of the shifter being coupled with the output ports of the memory, and the control input of the shifter being coupled with the instruction stream request control unit, the output of the shifter to provide an aligned instruction stream to an execution unit; and
   an instruction fetch unit coupled to the memory through the coupling unit, the instruction fetch unit including:
      a register coupled with the output of the shifter in parallel with the execution unit, the register to store the aligned instruction stream from the shifter, and
      means for writing a partial content of the register into the input of the shifter so as to shift the instruction stream to generate the aligned instruction stream at the output of the shifter.

13. Data processing unit according to claim 12, wherein the shifter is a barrel shifter.

14. Data processing unit according to claim 12, wherein the shifter is formed by multiplexers.

15. Data processing unit according to claim 12, wherein each instruction comprises m×p bits, wherein m>=1, and wherein the writing means is able to write q×p bits, where q<m, into the shifter.

16. Data processing unit according to claim 12, wherein the instruction stream request control unit receives an address and a shift value.

17. Data processing unit according to claim 16, wherein the instruction stream request control unit generates a control signal for the shifter from the address and the shift value.

18. A data processing unit having superscalar structure being able to execute a plurality of instructions in parallel, the data processing unit comprising:
   a memory for storing the instructions, the memory having a plurality of n-bit input/output ports;
   an instruction stream request control unit for addressing the memory to provide an instruction stream at the output ports of the memory;
   a coupling unit comprising a shifter having an input and an output and a control input, the input of the shifter being coupled with the output ports of the memory, and the control input of the shifter being coupled with the instruction stream request control unit;
   a register to store the instruction stream, the register having an input and an output, the input of the register being coupled to the output of the shifter;
   a merger unit having an input and an output, the output of the merger unit to provide instructions to an execution unit, the input of the merger unit being coupled in parallel to the output of the shifter and the output of the register, and
   write circuitry having an input and an output, the input of the write circuitry being coupled with the output of the register, the output of the write circuitry being coupled to the input of the register, the write circuitry to shift a partial content of the register based on a size of one or more previously issued instructions from the register.

19. Data processing unit according to claim 18, wherein the write circuitry includes a line driver and a plurality of multiplexers.

20. A data processing unit having superscalar structure being able to execute a plurality of instructions in parallel, the data processing unit comprising:

a memory for storing the instructions, the memory having a plurality of n-bit input/output ports;

an instruction stream request control unit for addressing the memory to provide an instruction stream at the output ports of the memory;

a coupling unit comprising a shifter having an input and an output and a control input, the input of the shifter being coupled with the output ports of the memory, and the control input of the shifter being coupled with the instruction stream request control unit, the output of the shifter to provide an aligned instruction stream to an execution unit; and an instruction fetch unit coupled to the memory through the coupling unit, the instruction fetch unit including:

a register coupled with the output of the shifter in parallel with the execution unit, the register to store the aligned instruction stream from the shifter, and means for writing a partial content of the register into the input of the shifter, the partial content being one or more instructions not previously issued.

* * * * *